United States Patent [19]

Horacek et al.

[11] 4,310,632

[45] Jan. 12, 1982

[54] PROCESS FOR THE MANUFACTURE OF POLYURETHANE FOAM

[75] Inventors: Heinrich Horacek, Ludwigshafen; Manfred Barl, Otterstadt; Rolf Wurmb, Heidelberg; Matthias Marx, Bad Durkheim, all of Fed. Rep. of Germany

[73] Assignee: BASF Aktiengesellschaft, Ludwigshafen, Fed. Rep. of Germany

[21] Appl. No.: 228,120

[22] Filed: Jan. 26, 1981

[30] Foreign Application Priority Data

Feb. 4, 1980 [DE] Fed. Rep. of Germany ....... 3003963

[51] Int. Cl.$^3$ .............................................. C08G 18/14
[52] U.S. Cl. .................... 521/121; 521/126; 521/127; 521/129; 528/53
[58] Field of Search ............... 521/121, 129, 126, 127; 528/53

[56] References Cited

U.S. PATENT DOCUMENTS 3,124,543  3/1964  Fowler et al. .................. 521/121
3,645,924  2/1972  Fogiel ............................ 528/53

*Primary Examiner*—Maurice J. Welsh
*Attorney, Agent, or Firm*—H. Lawrence Jones

[57] ABSTRACT

A process for making a polyurethane which comprises reacting an organic polyisocyanate with a higher molecular weight organic polyhydroxyl compound in the presence of a catalyst having the following formula:

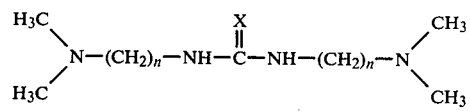

wherein X is sulfur or NH and n is a whole number from 2 to 6. Also used is a catalyst which is a combination of the above-mentioned catalyst and an organic tin compound.

8 Claims, No Drawings

PROCESS FOR THE MANUFACTURE OF POLYURETHANE FOAM

BACKGROUND OF THE INVENTION

1. Field of the Invention

This invention relates to a process for the manufacture of a thermoplastic or cross-linked polyurethane, or a polyurethane foam, from commonly used starting materials using as a catalyst, a guanidine or thiourea having the formula:

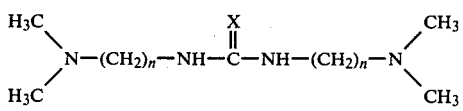

in which X is S or HN and n is a whole number from 2 to 6.

2. Description of the Prior Art

The manufacture of thermoplastic or cross-linked polyurethane plastics, or polyurethane foams, with widely diverse physical properties by known isocyanate-polyaddition processes from compounds having several Zerewitinoff active hydrogen atoms, such as higher molecular weight polyols and chain extenders and organic polyisocyanates using catalysts and optionally blowing agents, emulsifiers and other auxiliaries and additives has been conducted on an industrial scale for a long time. Polyurethane processes are described in monographs by J. H. Saunders and K. C. Frisch High Polymers, Volume XVI, "Polyurethanes," Parts I and II (Interscience Publishers, New York) and R. Vieweg and A. Hoechtlen, Plastics Handbook, Volume VII, Polyurethanes, Carl Hanser Publisher, Munich.

Polyurethane foams are preferably produced from liquid materials reacted either by the one-shot process or from an isocyanate group-containing prepolymer, made from a polyol and an excess of polyisocyanate, which is then cross-linked such as by reaction with chain extenders or with water and is foamed with blowing agents if the application so warrants.

Tertiary amines are suitable catalysts for the manufacture of polyurethanes, particularly polyurethane foams. These catalysts accelerate the reaction between hydroxyl groups and isocyanate groups as well as the reaction between water and isocyanates. The reaction rates of parallel reactions can be adjusted even when working according to the one-shot process. The catalyst not only determines the reaction rate but also decisively influences the physical properties of the resultant polyurethane.

Tertiary amines which do not contain active hydrogen atoms, such as triethylene diamine, N-ethylmorpholine, dimethylcyclohexylamine, pentamethyldiethylenetriamine, tetramethylbutylene diamine or bis(dimethylaminoethyl)ether, are not incorporated into the polyurethane plastics so that they may migrate as time goes by. This migration can result in undesirable side effects such as odor or skin irritation, and the accelerated hydrolytic decomposition of the completed foam. Also, the ongoing reactions are not always accelerated to such a degree as is required for an optimum reaction with respect to processability of the starting material and to the final properties of the polyurethanes.

Because tertiary amines which do contain reactive hydrogen atoms, such as 2-N,N-dialkylaminoethanols, N-alkyldiethanolamines and triethanolamines are incorporated into the polyurethanes, these amines show a faster reduction in catalytic effect threby delaying or even stopping the reaction.

High molecular weight catalysts such as tertiary amino-group containing polyether polyols are free of odor, but as a rule do not have sufficient catalytic activity.

A purpose of this invention was to develop a catalyst which does not have a bad odor or cause skin irritations, does not promote secondary reactions such as the formation of allophanate, biuret, isocyanurate and carbodiimide groups, and which guarantees the syncronous course of the polyurethane formation and the foaming process.

Surprisingly, this purpose is achieved by using a guanidine catalyst, a thiourea catalyst, and mixtures thereof for making polyurethanes, optionally in combination with organic tin compounds.

SUMMARY OF THE INVENTION

This invention relates to a process for the manufacture of a polyurethane by reacting an organic polyisocyanate with a higher molecular weight organic polyhydroxyl compound in the presence of one or more of a catalyst wherein a guanidine or thiourea having the following formula

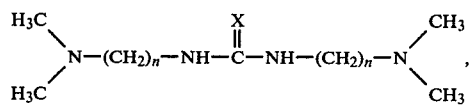

and optionally, a blowing agent, chain extender, auxiliary and additive. In the formula, X is sulfur or an imino (NH) group, and n is a whole number from 2 to 6.

DESCRIPTION OF THE PREFERRED EMBODIMEMTS

The guanidine or thiourea catalyst has weakly reactive hydrogen atoms and can, therefore, be incorporated in the polyurethane. An advantage in doing this is that the catalyst is incorporated slowly or only at increased temperatures so that its catalytic effectiveness is retained during the entire polyurethane formation.

Examples of the guanidine or thiourea used as the catalyst in this invention include: N,N'-bis(dimethylaminoethyl)guanidine, N,N'-bis(dimethylaminopropyl)guanidine, N,N'-bis(dimethylaminoethyl)thiourea, N,N'-bis(dimethylaminopropyl)thiourea, and N,N'-bis(dimethylaminobutyl)thiourea. A mixture of a guanidine and a thiourea, mixtures of guanidines, mixtures of thioureas and mixtures of the mixtures may be used as the catalyst. Preferably used are N,N'-bis(dimethylaminopropyl)thiourea, N,N'-bis(dimethylaminobutyl)thiourea, and N,N'-bis(dimethylaminopropyl)guanidine.

The bis-(dimethylaminoalkyl)-guanidine catalyst of this invention may be produced by the following process: 2.1 moles of a dimethylaminoalkylamine are dropped into a mole of guanidium-hydrochloride which was melted at 185° C. to 190° C. in an agitator device in a nitrogen stream so slowly that the reaction mixture retains the internal temperature of 175° C. to 185° C. Subsequently, the mixture is stirred at 185° C. for 30 minutes. Following this, the mixture is allowed to cool to 120° C. and another 2 moles of dimethylaminoalkylamine are added by dripping. After cooling to room temperature, the reaction mixture is stirred with 0.5 liters of 30 percent sodium hydroxide solution. The upper phase is separated and is concentrated with the aid of a rotation evaporator at 150° C. and 10 millibars. The desired bis-(dimethylaminoalkyl)-guanidine remains in the residue. If required, it may be purified according to commonly used methods, for instance, by transferring into the hydrochloride, transcrystallization from alcohol and liberating with sodium hydroxide solution.

The thiourea of use in this invention may be made by transamidization of thiourea with a corresponding dimethylaminoalkylamine and/or reaction of the amines with carbon disulfide (Houben-Weyl, Methods of Organic Chemistry, 4th Edition, Volume 9, pages 885 and 899, Georg Thieme Publishers, Stuttgart, 1955).

As a rule, 0.01 percent by weight to 5 percent by weight, preferably 0.5 percent by weight to 3 percent by weight, of guanidine or thiourea relative to the total weight of polyisocyanate and polyhydroxyl compound is used for the manufacture of the polyurethanes.

In accordance with the process of this invention, thermoplastic elastomers and flexible, semi-rigid or rigid polyurethane foams, as well as integral foams, can be manufactured. The guanidine or thiourea is preferably used as a catalyst for the manufacture of flexible polyurethane foams.

The polyurethanes, preferably polyurethane foams, are produced according to the process of this invention from the organic polyisocyanates and higher molecular weight organic polyhydroxyl compounds in the presence of the guanidine or thiourea as catalyst as well as optionally co-catalysts, blowing agents, chain extenders, auxiliaries and additives.

An organic tin compound is a suitable co-catalyst to form a catalyst combination with the guanidine or thiourea. Examples include tin(II)-salts of carboxylic acids such as tin(II)-acetate, tin(II)-octoate, tin(II)-ethylhexoate, and tin(II)-laurate and the tin(IV) compounds such as dibutyltin oxide, dibutyltin dichloride, dibutyldiacetate, dibutyltin maleate, dioctyltin diacetate, and preferably dibutyltin dilaurate. The tin compounds may be combined with the guanidine and thiourea of this invention If a catalyst combination is used for the manufacture of the polyurethanes, this catalyst combination advantageously consists of 0.01 percent by weight to 5 percent by weight, preferably 0.5 percent by weight to 3 percent by weight of the guanidine or thiourea and 0.01 percent by weight to 2 percent by weight, preferably 0.1 percent by weight to 1 percent by weight of an organic tin compound, relative to the total weight of polyisocyanate and polyhydroxyl compound.

Organic polyisocyanates, herein sometimes called polyisocyanate, includes aliphatic, cycloaliphatic and preferably aromatic multifunctional isocynates. Examples include in detail: alkylene diisocyanates having 2 to 14 carbon atoms in the alkylene radical such as ethylene diisocyanate, 1,4-tetramethylene diisocyanate, 1,12-dodecane diisocyanate, and preferably 1,6-hexamethylene diisocyanate; cycloaliphatic di- and polyisocyanates such as cyclobutane-1,3-diisocyanate, cyclohexane-1,3- and -1,4-diisocyanate, as well as any desired mixture of these isomers, hexahydrotoluene-2,4- and -2,6-diisocyanate as well as the corresponding isomer mixtures, 2,2'-, 2,4'- and 4,4'-dicyclohexylmethane diisocyanate and the corresponding isomer mixtures, polycyclohexyl-polymethylene polyisocyanates, mixtures of dicyclohexylmethane diisocyanates, and polycyclohexyl-polymethylene polyisocyanates and preferably 1-isocyanato-3,3,5-trimethyl-5-isocyanatomethyl-cyclohexane and preferably aromatic di- and polyisocyanates such as 1,3-and 1,4-phenylene diisocyanate, 2,2'-, 2,4'- and 4,4'-diphenylmethane diisocyanate and the corresponding isomer mixtures, 2,4- and 2,6-tolulene diisocyanate as well as the corresponding isomer mixtures, 2,4,6-triisocyanatotoluene, triphenylmethane-4,4',4"-triisocyanate and polyphenyl-polymethylene polyisocyanates and preferably mixtures of di- and polyphenyl-polymethylene polyisocyanates (crude MDI). The di- and polyisocyanates may be used individually or in the form of mixtures.

Also used as polyisocyanate are so-called modified multifunctional isocyanates, that is, products which are obtained by the chemical reaction of the above-mentioned di- and/or polyisocyanates. Examples for modified organic di- and polyisocyanates include, for instance: carbodiimide group containing polyisocyanates in accordance with German Pat. No. 1,092,007, allophanate group containing polyisocyanates as they are described, for instance, the British Pat. No. 994,890, and the published data of Belgian Pat. No. 761,626 and the Netherlands Published Application No. 7,102,524; isocyanate group containing polyisocyanates as they are described, for instance, in German Pat. No. 1,022,789; 1,222,067; and 1,027,394 as well as German Published Application Nos. 1,929,034 and 2,004,048; urethane group containing polyisocyanates as described, for instance, in published data of Belgian Pat. No. 752,261 or U.S. Pat. No. 3,394,164; aceylated urea group containing polyisocyanates, for instance, in accordance with German Pat. No. 1,230,778; biuret group containing polyisocyanates, for instance, in accordance with German Pat. No. 1,101,394 and British Pat. No. 889,050; polyisocyanates produced by telemerization reactions, for instance, corresponding with the published data of Belgian Pat. No. 723,640; ester group containing polyisocyanates as they are mentioned, for instance, in British Pat. Nos. 965,474 and 1,072,956, U.S. Pat. No. 3,567,765 and German Pat. No. 1,231,688. Preferably used are urethane group containing polyisocyanates, isocyanurate ring containing polyisocyanates, and particularly toluene diisocyanates, diphenylmethane diisocyanates, mixtures of diphenylmethane diisocyanates and polyphenyl-polymethylene polyisocyanates (crude MDI), and mixtures of toluene diisocyanates and crude MDI.

Used as higher molecular weight organic polyhydroxyl compounds, herein sometimes called polyhydroxyl compounds, in the process of this invention, are familiar linear and/or branched polyester polyols and particularly polyether polyols having molecular weights of 200 to 8000, preferably 800 to 5000, and more preferably 1800 to 3500. Other hydroxyl group containing polymers with the abovementioned molecular weight ranges can also be used, such as polyester amides, polyacetals such as polyoxymethylenes and polycarbonates, preferably those produced from diphenyl carbonates and 1,6-hexanediol by transesterification.

The polyester polyols may be produced from dicarboxylic acids, prefeably aliphatic dicarboxylic acids having 2 to 12, preferably 4 to 8, cabon atoms in the alkylene radical and multifunctional alcohols, preferably diols. Examples include aliphatic dicarboxylic acids such as pimelic acid, suberic acid, azelaic acid, sebacic acid, undecane dioic acid, dodecane diolic acid, and preferably succinic, glutaric and adipic acid, and aromatic dicarboxylic acids such as phthalic acid and terephthalic acid. Examples for di- and multifunctional, preferably di- and trifunctional alcohols are ethylene glycol, diethylene glycol, 1,2-propylene glycol and/or trimethylene glycol, dipropylene glycol, 1,10-decanediol, glycerine, trimethylol propane and preferably 1,4-butanediol and 1,6-hexanediol.

If multifunctional, preferably trifunctional, alcohols are used for the manufacture of the polyester polyols, their content is advantageously calculated in such a manner that the functionality of the resultant polyester polyol has a maximum of 2.5.

The polyester polyols have molecular weights of 500 to 2800, preferably of 1000 to 2000, and hydroxyl numbers of 40 to 280, preferably of 50 to 120.

The polyether polyols are preferably used as polyhydroxyl compounds, and produced according to familiar processes from one or more alkylene oxides having 2 carbon atoms to 4 carbon atoms in the alkylene radical and a starter molecule containing 2 active hydrogen atoms to 8 active hydrogen atoms, preferably 2 active hydrogen atoms to 4 active hydrogen atoms.

Suitable alkylene oxides include 1,2- and/or 2,3-butylene oxide, and preferably ethylene oxide and 1,2-propylene oxide. The alkylene oxides and the below-mentioned oxides may be used individually, alternatingly in sequence, or as mixtures. Also included within the definition of alkylene oxides are styrene oxide, 1,3-propane oxide, tetrahydrofuran and suitable mixtures.

Initiators include: water, organic dicarboxylic acids such as succinic acid, adipic acid, phthalic acid and terephthalic acid, aliphatic and aromatic N-mono-, N,N- and N,N'-dialkyl-substituted diamines having 1 carbon atoms to 4 carbon atoms in the alkyl radical as well as alternatively mono- and dialkyl-substituted ethylene diamine, diethylene triamine, triethylene tetramine, 1,3-propylene diamine, 1,3-or 1,4-butane diamine, 1,2-, 1,3-, 1,4-, 1,5- and 1,6-hexamethylene diamine, phenylene diamine, 2,4- and 2,6-toluene diamine, and 4,4'-, 2,4'-, 2,2-diaminodiphenylmethane; monoamines such as methylamine, ethylamine, isopropylamine, butylamine, benzylamine, aniline, the toluidines and naphthalene. Of the above-mentioned groups, the following compounds are preferably used: N,N,N', N'-tetrakis(2-hydroxyethyl)ethylenediamine, N,N,N',N'-tetrakis(2-hydroxypropyl)ethylenediamine, N,N,N',N'',N''-pentakis-(2-hydroxypropyl)ethylenetriamine, phenyldiisopropanolamine, and higher alkylene oxide adducts of aniline.

Other suitable initiator molecules include alkanolamines such as ethanolamine, diethanolamine, N-methyl and N-ethyldiethanolamine, N-methyl and N-ethyldiethanolamine, and triethanolamine, hydrazine and hydrazides. Preferably used are multifunctional, particularly di- and/or trifunctional alcohols such as ethylene glycol, 1,2-propylene glycol and trimethylene glycol, diethylene glycol, dipropylene glycol, 1,4-butane glycol, 1,6-hexamethylene glycol, glycerine, trimethylolpropane and pentaerythritol.

Other applicable polyhydroxyl compounds are the non-reducing sugars, the non-reducing sugar derivates, and preferably their alkylene oxide adducts wherein the alkylene oxides have 2 to 4 carbon atoms. Applicable non-reducing sugar and sugar derivates include sucrose, alkylglycosides such as methylglycoside and ethylglucoside, also glycol glycosides such as ethylene glycol glycoside, propylene glycoside, glycerine glycosides, and 1,2,6-hexanetriol glycosides.

Also to be taken into consideration are polyhydroxyl compounds based on polyphenols and preferably their alkylene oxide adducts in which the alkylene oxides have 2 carbon atoms to 4 carbon atoms. Applicable polyphenols include bisphenol A, bisphenol F, condensation products of phenol and formaldehyde, particularly the Novolaks, condensation products of various phenol compounds and acroleine with the simplest substances of this group being the 1,1,3-tris(hydroxyphenyl)propanes, condensation products of various phenol compounds with glyoxal, glutaraldehyde and other dialdehydes with the simplest substances of this group being the 1,1,2,2-tetrakis(hydroxylphenyl)ethanes.

Another useful group of polyhydroxyl compounds are the alkylene oxide adducts, preferably the ethylene oxide, 1,2-propylene oxide, epoxybutane adducts and their mixtures, adducts of condensation products of aromatic amine, phenol and aldehyde. Condensation products are obtained by condensing an aromatic amine, for instance, aniline or toluidine, a phenol, for instance, phenol or cresol, and an aldehyde, preferably, formaldehyde at increased temperatures, for instance, in the range of 60° C. to 180° C. The condensation product is then isolated and reacted with an alkylene oxide by forming the polyols. Particularly worth mentioning are the propylene oxide and propylene-ethylene oxide adducts of aniline/phenol/formaldehyde condensation products.

The alkylene oxide adducts of phosphoric and polyphosphoric acids represent another applicable group of polyhydroxyl compounds. Preferred alkylene oxides are ethylene oxide, 1,2-epoxypropane, the epoxybutanes and 3-chloro-1,2-epoxypropane. Suitable phosphoric acids are phosphorus acid, the polyphosphoric acids such as tripolyphosphoric acid and the polymetaphosphoric acids.

Preferably used are polyether polyols having molecular weights of 400 to 10,000, preferably 400 to 6000, and hydroxyl numbers of 20 to 400, preferably of 25 to 150, which contain ethylene oxide as well as 1,2-propylene oxide units in the oxyalkylene chain with these units being in either heteric or block arrangement in the oxyalkylene chain. Particularly well suited and used are polyether polyols which have preferably primary hydroxyl groups. The polyhydroxyl compounds used may have a hydroxyl number which can vary within a wide range.

The higher molecular weight organic polyhydroxyl compounds are chosen in each case based on the final application of the polyurethane to be produced therefrom.

The polyurethane foams are produced in the presence of a blowing agent. A suitable blowing agent is carbon dioxide which is formed from water and polyisocyanates. Water is used in an amount between 0.1 percent by weight and 2 percent by weight, relative to the weight of the polyisocyanate. Under certain conditions, larger amounts of water may also be used. Preferably, this should not be done when the thermal stability or the thermal insulating properties of the resultant foams are important.

Other useful blowing agents are low-boiling liquids, which evaporate under the influence of the exothermal polyaddition reaction. Suited liquids have boiling points under 100° C. and which are inert with respect to the organic polyisocyanate. Examples of such preferably used liquids include halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling liquids with each other and/or with other substituted or unsubstituted hydrocarbons may also be used.

The most appropriate amount of low-boiling liquids to be used in the manufacture of polyurethane foams is a function of the foam density which is to be attained as well as the use of water. Generally, quantities of 5 percent by weight to 40 percent by weight, relative to 100 parts by weight of polyisocyanate, will bring about satisfactory results.

Whereas normal flexible or semi-rigid foam types are preferably foamed with water as blowing agent, physical blowing agents are usually applied in the manufacture of integral foams, that is, foams having a compact outside skin.

The use of a chain extender, in addition to the higher molecular weight polyhydroxyl compounds, may also be advantageous in the manufacture of the polyurethanes under certain circumstances. The chain extenders have molecular weights of less than 2000, preferably between 30 and 600, and preferably have 2 active hydrogen atoms. Examples include aliphatic and/or aromatic diols having 2 to 14, preferably 4 to 10, carbon atoms, such as ethylene glycol, propanediol, 1,10-decanediol, and preferably 1,4-butanediol, 1,6-hexanediol, and bis-(2-hydroxyethyl)hydroquinone, diamines such as ethylene diamine and 4,4'-diaminodiphenylmethane, ethanolamines such as triethanolamine and polyhydroxyl compounds such as glycerine, trimethylolpropane and low molecular weight hydroxyl group containing polyalkylene oxides of the above-mentioned materials.

An auxiliary and additives may be incorporated in the reaction mixture such as surface-active foam stabilizers, hydrolysis protection agents, pore regulators, fungistats and bacteriostats, dyes, pigments, flame retardants and reinforcing agents.

Useful surface-active agents which support the homogenization of the raw materials and which are useful for regulating the cell structure of the foams are siloxaneoxalkylene-mixed polymers and other organopolysiloxanes, ethoxylated alkylphenols, ethoxylated fatty alcohols, paraffin oils, castor oil or respectively, resinoleic esters, and turkish red oil, which are used in quantities of 0.2 parts by weight to 6 parts by weight per 100 parts by weight of polyisocyanate.

Suitable flame retardants include tricresyl phosphate, tris-2-chloroethylphosphate, tris-chloropropylphosphate and tris-2,3-dibromopropylphosphate.

In addition to the above-mentioned halogen-substituted phosphates, organic flame retardants such as antimony trioxide, arsenic oxide, ammonium phosphate and calcium sulfate, may also be used as flame retardants for the polyurethane foams. Generally, 5 parts by weight to 50 parts by weight, preferably 5 parts by weight to 25 parts by weight, of flame retardant per 100 parts by weight of polyisocyanate are used.

Reinforcing agents include organic polymer polyol mixtures and inorganic fillers. The organic polymer polyol mixtures may be produced by mixing aqueous homo- and/or copolymer dispersions with polyols and subsequently separating the water or preferably by in situ graft polymerization of styrene and particularly styrene-acrylonitrile mixtures and polyols. Examples of inorganic reinforcing agents include solutions of alkali salts of inorganic acids such as aqueous potassium fluoride, potassium chloride, and sodium chloride solutions. The reinforcing agents are commonly used in quantities of 2 percent by weight to 20 percent by weight, preferably 5 percent by weight to 13 percent by weight, relative to the total weight of polyisocyanate and polyhydroxyl compound.

More detailed data concerning the above-mentioned auxiliaries and additives may be found in references such as J. H. Saunders and K. C. Frisch, "High Polymers", Vol. XVI, Polyurethanes, Part 1 and 2, Interscience Publishers, 1962 or 1964.

In order to produce the polyurethanes, the organic polyisocyanates and polyhydroxy compounds and/or mixtures of polyhydroxyl compounds and chain extenders, are reacted in such quantities that the ratio of NCO to OH groups is 1:0.8 to 1.2, preferably approximately 1:1.

The polyurethanes, preferably polyurethane foams, are produced in accordance with the prepolymer and preferably in accordance with the one-shot process. Using a mixing chamber with several feed nozzles, the raw materials may be introduced individually and may be mixed intensively in the mixing chamber. It has proven to be particularly advantageous to work in accordance with the two-component process and to combine the mixture of polyhydroxyl compound, catalyst and optionally chain extenders, blowing agent, auxiliaries and additives to form component X, and to use the polyisocyanate as component Y. An advantage in using this method is, for instance, that the components X and Y can be stored separately and can be transported in a space-saving manner.

In order to manufacture the polyurethanes, the described materials are mixed intensively at the above-mentioned ratios and temperatures of 20° C. to 60° C., preferably 25° C. to 45° C.

In making polyurethane elastomers, the reactive mixtures are poured into open molds or onto sheets where they react. In order to complete the conversion, the solidified products are tempered at 60° C. to 150° C., preferably 80° C. to 120° C., for 2 hours to 48 hours, preferably 12 hours to 24 hours. The resultant elastomers have densities of 1.1 grams per cubic centimeter to 0.8 gram per cubic centimeter, Shore A hardness of 50 to 100, and are useful for the manufacture of rolls, buffers, bumpers, and belts.

Foamable reaction mixtures are allowed to foam in open or closed molds resulting in polyurethane foams.

Depending upon the type of resultant polyurethane foams, the products have densities of 30 kilograms per cubic meter to 300 kilograms per cubic meter for flexible foams, of 60 kilograms per cubic meter to 300 kilograms per cubic meter for semi-rigid foams, and of 10 kilograms per cubic meter to 300 kilograms per cubic meter for rigid foams as well as average densities of 100 kilograms per cubic meter to 800 kilograms per cubic meter for integral foams.

The resultant polyurethane foams are used in the familiar areas of applications for polyurethanes such as furniture and upholstered furniture foam, insulating foam as well as for the manufacture of finished parts in the automobile industry such as arm rests, bumpers, dashboards, etc.

The following examples will further illustrate the various aspects of the invention. Where not otherwise specified throughout this specification and claims, temperatures are in degrees Centigrade and parts, percentages and proportions are by weight.

EXAMPLES 1-6 AND COMPARISON EXAMPLES A-C

Rigid Foam Formulations

Component X is a mixture of:
100 parts of a polyether polyol having an OH number of 400 and a molecular weight of 600
1 part foam stabilizer based on polyether polysiloxane block copolymers
2.5 parts water
40 parts trichlorofluoromethane and
2.5 parts catalyst.

Component Y is a mixture of: Diphenylmethane diisocyanates and polyphenyl polymethylene polyisocyanates (crude MDI) having an isocyanate content of 32 percent by weight.

Component X and Component Y are intensively mixed within 10 seconds using a agitator having a speed of rotation of 1000 rpm. The homogeneous mixture is poured into a block shaped mold having dimensions of 10 centimeters by 10 centimeters by 20 centimeters. The foam times are registered using a fluidyne device.

The catalyst used, the mixing ratio of Component Y to Component X, the measured pot time $t_1$ and rise time $t_2$ are summarized in Table 1.

The catalysts of this invention provide easily processable polyurethane formulations. The polyurethane rigid foams produced with the catalysts of this invention have a neutral odor and are non-toxic. They have densities of 30 kilograms per cubic meter and a compression strength of 0.16 N/mm$^2$ at 10 percent compression (DIN 53421).

TABLE 1

| Examples Comparison Examples | Catalyst | Molecular Wt. | Pot Time $t_1$(sec) | Rise Time $t_2$(sec) | Mixing Ratio Components Y:X [parts] |
|---|---|---|---|---|---|
| 1 | N,N'-bis(dimethyl-aminoethyl)guanidine | 173 | 35 | 300 | 146:146 |
| 2 | N,N'-bis(dimethyl-aminopropyl)guanidine | 201 | 26 | 240 | 146:146 |
| 3 | N,N'-bis(dimethyl-aminobutyl)guanidine | 229 | 15 | 120 | 146:146 |
| 4 | N,N'-bis(dimethyl-aminoethyl)thiourea | 190 | 90 | 480 | 146:146 |
| 5 | N,N'-bis(dimethyl-aminopropyl)thiourea | 218 | 28 | 150 | 146:146 |
| 6 | N,N'-bis(dimethyl-aminobutyl)thiourea | 246 | 25 | 100 | 146:146 |
| A | Triethylenediamine 33% in dipropylene glycol | 112 | 36 | 134 | 146:146 |
| B | Dimethylisoproanol-amine | 103 | 44 | 530 | 146:146 |
| C | Nitrogen group containing polyol of 550 OH number | 348 | 27 | 125 | 139:100 |

EXAMPLE 7-12 AND COMPARISON EXAMPLES D-F

Semi-Rigid Foam Formulations

Component X is a mixture of:
95 parts of a polyether polyol having a hydroxyl number of 25 and a molecular weight of 6500
1.5 parts of glycerine
1.6 parts of water, and
0.75 part of catalyst.

Component Y is a mixture of: Diphenylmethane diisocyanates and polyphenylpolymethylene polyisocyanates (crude MDI) having an isocyanate content of 32 percent by weight.

Components X and Y are reacted according to the procedure of Examples 1-6.

The catalyst used, the mixing ratio of Component Y to Component X, the measured pot time $t_1$ and rise time $t_2$ are summarized in Table 2.

The semi-rigid polyurethane foams produced with the catalysts of this invention have densities of 170 kilograms per cubic meter and a compression strength of 34 KPa with a 20 percent compression.

TABLE 2

| Examples Comparison Examples | Catalyst | Molecular Wt. | Pot Time $t_1$(sec) | Rise Time $t_2$(sec) | Mixing Ratio Components Y:X [parts] |
|---|---|---|---|---|---|
| 7 | N,N'-bis(dimethyl-aminoethyl)guanidine | 173 | 48 | 350 | 49:98.85 |
| 8 | N,N'-bis(dimethyl-aminopropyl)guanidine | 201 | 34 | 218 | 49:98.85 |
| 9 | N,N'-bis(dimethyl-aminobutyl)guanidine | 229 | 25 | 190 | 49:98.85 |
| 10 | N,N'-bis(dimethyl-aminoethyl)thiourea | 190 | 90 | 300 | 49:98.85 |
| 11 | N,N'-bis(dimethyl-aminopropyl)thiourea | 218 | 46 | 228 | 49:98.85 |
| 12 | N,N'-bis(dimethyl-aminobutyl)thiourea | 246 | 35 | 200 | 49:98.85 |
| D | Triethylenediamine | 112 | 60 | 240 | 49:98.85 |

TABLE 2-continued

| Examples Comparison Examples | Catalyst | Molecular Wt. | Pot Time $t_1$(sec) | Rise Time $t_2$(sec) | Mixing Ratio Components Y:X [parts] |
|---|---|---|---|---|---|
| | 33% in dipropylene glycol | | | | |
| E | Dimethylethanolamine | 89 | 45 | 270 | 49:98.85 |
| F | Nitrogen group containing polyol of 550 OH number | 4800 | 60 | 500 | 79:100 |

EXAMPLES 13-18 AND COMPARISON EXAMPLES G, H J

Flexible Foam Formulations

Component X:
A mixture of:
96 parts of a polyether polyol having an OH number of 35 and a molecular weight of 4900
2.7 parts of water
1.5 parts of a foam stabilizer mixture, and
1.0 part of catalyst
is mixed with 35 parts of a mixture of
parts of crude MDI and 28 parts of 2,4- and 2,6-toluene diisocyanate (weight ratio 80:20) having an isocyanate content of 45 percent by weight and this mixture is poured into a mold.

The catalyst used, the measured pot time $t_1$ and rise time $t_2$ are summarized in Table 3.

The flexible foams produced in accordance with the process of this invention have densities of 45 kilograms per cubic meter and a hardness number of 60 with 65 percent compression (DIN 53577).

TABLE 3

| Examples, Comparison Examples | Catalyst | Pot Time $t_1$(sec) | Rise Time $t_2$(sec) |
|---|---|---|---|
| 13 | N,N'-bis(dimethylaminoethyl)guanidine | 12 | 180 |
| 14 | N,N'-bis(dimethylaminopropyl)guanidine | 12 | 145 |
| 15 | N,N'-bis(dimethylaminobutyl)guanidine | 8 | 95 |
| 16 | N,N'-bis(dimethylaminoethyl)thiourea | 8 | 120 |
| 17 | N,N'-bis(dimethylaminopropyl)thiourea | 8 | 100 |
| 18 | N,N'-bis(dimethylaminobutyl)thiourea | 8 | 100 |
| G | Triethylenediamine 33% in dipropylene glycol | 8 | 80 |
| H | Dimethylethanolamine | 10 | 115 |
| J | Nitrogen group containing polyol, OH number = 35 Molecular weight 4800 | 20 | Collapse |

The embodiments of the invention in which an exclusive property or priviledge is claimed are defined as follows:

1. A process for the manufacture of a polyurethane which comprises reacting an organic polyisocyanate with a higher molecular weight organic polyhydroxyl compound in the presence of one or more of a catalyst having the following formula:

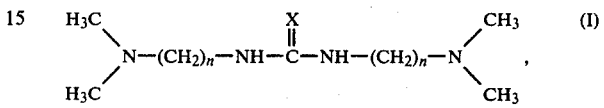

wherein X is sulfur or imino (NH) and n is a whole number from 2 to 6.

2. The process of claim 1 which further comprises adding to the reaction mixture a chain extender and a blowing agent.

3. The process of claim 1 wherein said catalyst comprises a combination of a compound of formula (I) and an organic tin compound.

4. The process of claim 2 wherein said catalyst comprises a combination of a compound of formula (I) and an organic tin compound.

5. In a process of making a polyurethane foam by reacting an organic polyisocyanate with a higher molecular weight polyhydroxyl compound in the presence of a catalyst, a blowing agent, a chain extender, an auxiliary and an additive, the improvement which comprises catalyzing the reaction with a material having the formula:

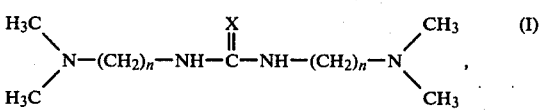

wherein X is sulfur or imino (NH) and n is a whole number from 2 to 6.

6. The process of claim 5 wherein said catalyst is a combination of the material of formula (I) and an organic tin compound.

7. The process of claim 5 wherein said catalyst is used in an amount between 0.01 percent by weight to 5 percent by weight, based on the total weight of organic polyisocyanate and higher molecular weight polyhydroxyl compound.

8. The process of claim 6 wherein the material of formula (I) is used in an amount between 0.5 percent by weight and 3 percent by weight and the organic tin compound is used in an amount between 0.1 percent by weight and 1 percent by weight, all based on the total weight of organic polyisocyanate and higher molecular weight organic polyhydroxyl compounds.

* * * * *